E. TROBECK.
METAL WORKING MACHINE.
APPLICATION FILED NOV. 28, 1913.
1,092,462.
Patented Apr. 7, 1914.
2 SHEETS—SHEET 1.
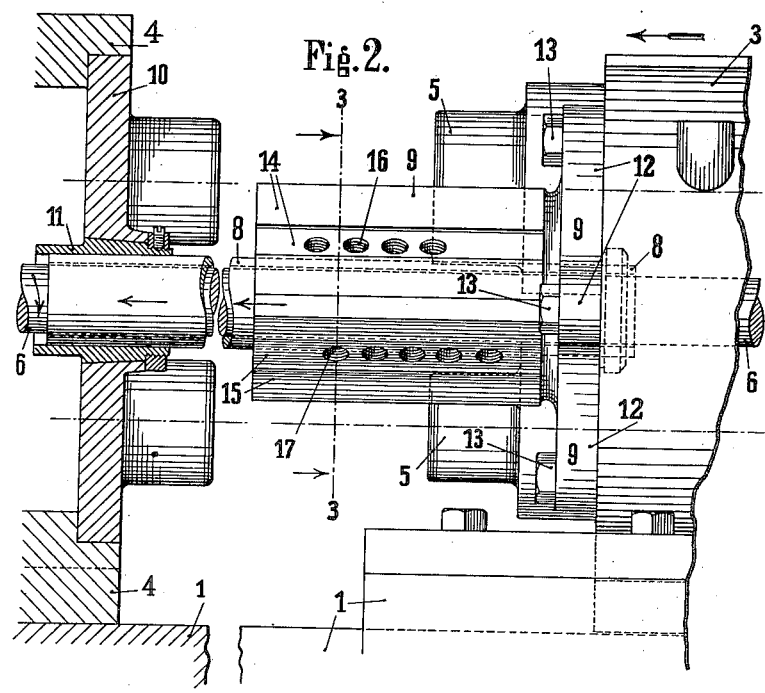
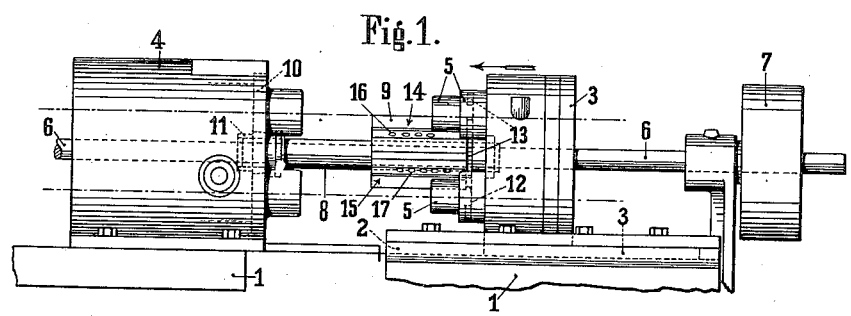

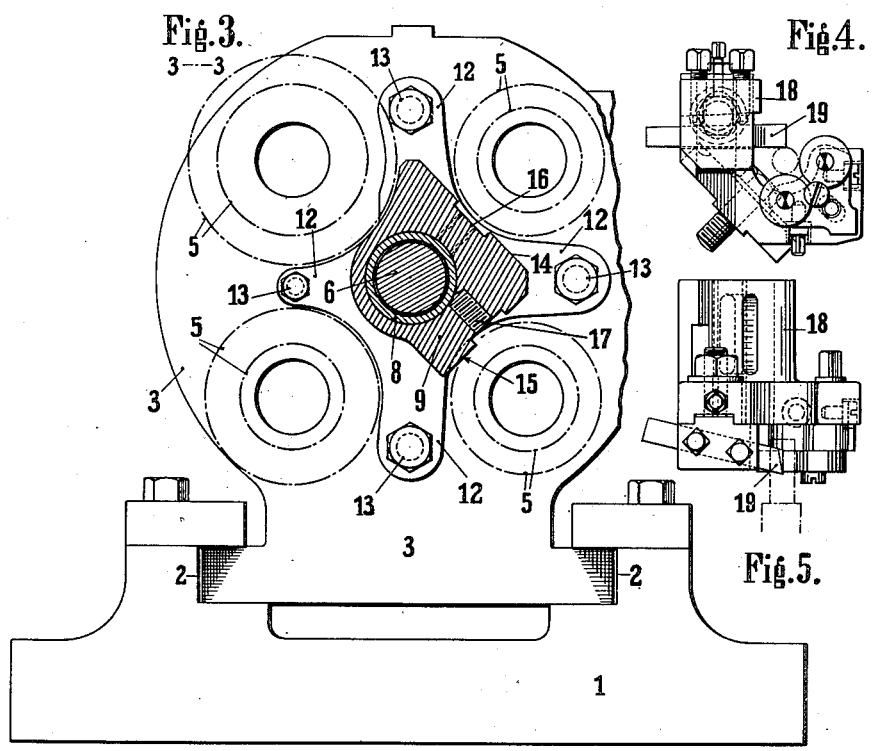

UNITED STATES PATENT OFFICE.

ENOCH TROBECK, OF CHARLOTTENBURG, GERMANY, ASSIGNOR TO THE NATIONAL-ACME MANUFACTURING COMPANY, OF CLEVELAND, OHIO, A CORPORATION OF OHIO.

METAL-WORKING MACHINE.

1,092,462. Specification of Letters Patent. Patented Apr. 7, 1914.

Application filed November 28, 1913. Serial No. 803,452.

*To all whom it may concern:*

Be it known that I, ENOCH TROBECK, a citizen of the United States, residing at Waitzstrasse 21, Charlottenburg, in the Empire of Germany, have invented new and useful Improvements in Metal-Working Machines, of which the following is a specification.

This invention relates to metal working machines, more particularly to multiple spindle screw machines, the object of the invention being to provide an improved machine of this character by means of which additional as well as better work may be done along certain lines, the present improvement consisting in part in providing the tool slide or tool carrier, which in machines of this character is supported by and slides back and forth on the bed of the machine, with a projection or extension preferably of tubular or cylindrical form extending into the work spindle cylinder or turret so as to slide therein when the tool slide is advanced toward such work spindle turret or cylinder, and which projection or extension is especially adapted for carrying a box-tool support.

This construction has among other advantages the one that for work required to be turned on the outside diameter and drilled centrally I can use the tools attached to the central tool-holder for turning and use the drill spindles of the regular slide for drilling the hole.

The inclosed drawings illustrate one modification of the invention.

Figure 1 is an elevation of the machine according to the present invention. Fig. 2 is an elevation of the central part of the machine illustrated in Fig. 1, partly in section, on an enlarged scale. Fig. 3 is a section on line 3—3 of Fig. 2 looking in the direction of the arrows in Fig. 2. Figs. 4 and 5 show one form of box tools used in connection with the invention.

The bed of the machine 1 carries the tool carrier or slide 3 which is guided on the bed in line with the work carrying cylinder or turret 4 in the customary way.

5 are the tool spindles in the tool slide.

6 is a driving shaft with a pulley 7.

8 is the tubular extension of the central tool carrier 9, this tubular extension being in the form of a non-rotatable shaft. In the structure shown in the drawings this tubular extension 8 is bored out to permit the main driving shaft 6 to pass freely through it without any bearing on the inside of the tubular part 8.

The tubular part 8 enters through the front of the work spindle cylinder 10 and is preferably guided in an adjustable bronze bushing 11 attached to the said work spindle cylinder. By this arrangement the main shaft 6 is free to revolve without any bearing to the tube 8. In advancing the tool carrying slide 3 toward the work spindle cylinder 10 the tubular extension 8 telescopes correspondingly into the adjustable split bushing 11 attached to the said work carrying cylinder 10 in such a manner as to produce the proper bearing on the outside of the tool carrier extension without having any contact of the inside of the tool carrier extension to the driving shaft 6. The work carrying cylinder 10 is free to revolve around the tubular extension 8. The central tool carrier 9 with its tubular extension 8 may have the shape as indicated in Figs. 2 and 3 and comprises a block or bracket attached to the face of the slide by means of four lateral arms 12 at 13 or can be built as an integral part of the tool slide.

The central tool holder or its extending part is suitably constructed for receiving the necessary tools. In the structure shown in the drawings there are two flats or surfaces 14 and 15 having threaded holes 16 and 17 so that the turning tools can be attached in different positions. In the specific construction shown in the drawings the two surfaces 14 and 15 are arranged on an angle of 90° which is suitable for machines with four working spindles. Any other arrangement may be made for a different number of spindles and the special purpose required.

In Figs. 4 and 5 18 refers to the box tool and 19 to the cutter or turning tool. Preferably the central tool holder 9 is constructed and arranged in such a manner that the tool spindles remain free and can be used for internal work or drilling simultaneously with the outside turning.

The bushing 11 for the tubular extension 8 is adjustable so that it can be readily adjusted to compensate for any wear that may occur and this adjustability is obtained by longitudinally splitting the bushing 11.

What I claim is:

1. In a machine of the class described, having a bed, the combination with a work carrying head, of a sliding tool carrier mounted on the bed and having a shaft carried thereby for movement therewith and extending into and sliding in said work carrying head on the back and forth movement of the tool carrier for supporting a tool support in advance of the sliding tool carrier.

2. In a machine of the class described having a bed, the combination with a work carrying head, of a sliding tool carrier mounted on the bed and having a tubular shaft carried thereby for movement therewith and extending into and sliding in said work carrying head on the back and forth movement of the tool carrier for supporting a tool support in advance of the sliding tool carrier, and a driving shaft extending through said tubular shaft.

3. In a machine of the class described having a bed, the combination with a work carrying head, of a sliding tool carrier mounted on the bed, a shaft carried by one of said parts and extending into the other of said parts, said shaft and the part into which it extends having a sliding movement relatively one to the other, and a tool support mounted on said shaft between said head and said sliding tool carrier.

4. In a machine of the class described having a bed, the combination with a rotatable work carrying head, of a non-rotatable sliding tool carrier mounted on the bed, a non-rotatable shaft carried by one of said parts and extending into the other of said parts, said shaft and the part into which it extends having a sliding movement relatively one to the other, and a tool support mounted on said shaft between said head and said sliding tool carrier.

5. In a machine of the class described having a bed, the combination with a rotatable work carrying head, of a non-rotatable sliding tool carrier mounted on the bed, a non-rotatable tubular shaft carried by one of said parts and extending into the other of said parts, said shaft and the part into which it extends having a sliding movement relatively one to the other, a tool support mounted on said shaft between said head and said sliding tool carrier, and a driving shaft extending through said tubular shaft.

6. In a machine of the class described having a bed, the combination with a work carrying head, of a sliding tool carrier mounted on the bed and having a tubular shaft carried thereby for movement therewith and extending into and sliding in said work carrying head on the back and forth movement of the tool carrier for supporting a tool support in advance of the sliding tool carrier, and a driving shaft extending through said tubular shaft, the interior diameter of the tubular shaft and the exterior diameter of the inner shaft being such that the two shafts are spaced one from the other.

7. In a machine of the class described having a bed, the combination with a work carrying head, of a sliding tool carrier mounted on the bed and having a shaft carried thereby for movement therewith and extending into and sliding in said work carrying head on the back and forth movement of the tool carrier, a tool support mounted on said shaft in advance of the sliding tool carrier and secured to the front face of said sliding tool carrier.

8. In a machine of the class described having a bed, the combination with a rotatable work carrying head of a centrally located bushing secured thereto, a non-rotatable sliding tool carrier mounted on the bed and having a shaft carried thereby for movement therewith and extending into and sliding in said bushing of the rotatable work carrying head on the back and forth movement of the tool carrier, and a tool support located on said shaft and secured to said sliding tool carrier for supporting the tools in advance of said tool carrier.

9. In a machine of the class described having a bed, the combination with a rotatable work carrying head of a centrally located adjustable bushing secured thereto, a non-rotatable sliding tool carrier mounted on the bed and having a shaft carried thereby for movement therewith and extending into and sliding in said bushing of the rotatable work carrying head on the back and forth movement of the tool carrier, and a tool support located on said shaft and secured to said sliding tool carrier for supporting the tools in advance of said tool carrier.

10. In a machine of the class described having a bed, the combination with a rotatable work carrying head, of a non-rotatable sliding tool carrier mounted on the bed and having a shaft carried thereby for movement therewith and extending into and sliding in said work carrying head on the back and forth movement of the tool carrier, a tool support mounted on said shaft and secured to the sliding tool carrier for movement therewith and so located relatively to the sliding tool carrier that the tool spindles thereof are free and available for inside drilling operations.

11. In a multiple spindle screw machine having a bed, the combination with a rotatable work carrying turret, of a sliding tool carrier mounted on the bed and having a plurality of spindles and a centrally located shaft carried thereby for movement therewith and extending into and sliding in said turret on the back and forth movement of the tool carrier, and a tool support carried by said shaft and located between the tool spindles of the sliding tool carrier so as not to interfere with the work thereof.

12. In a multiple spindle screw machine having a bed, the combination with a sliding tool carrier mounted on the bed and with a work spindle carrying head, of a non-rotatable member extending into said work spindle head from the tool slide and adapted to have turning tools secured thereto.

13. In a multiple spindle screw machine having a bed, the combination with a sliding tool carrier mounted on the bed and with a work spindle carrying head, of a non-rotatable member extending into said work spindle head from the tool slide, and a tool support carried thereby and having surfaces for the reception of turning tools so located thereon as to leave the tool spindles free and available for inside drilling operations.

In testimony, that I claim the foregoing as my invention, I have signed my name in presence of two subscribing witnesses.

ENOCH TROBECK.

Witnesses:
HENRY HASPER,
WOLDEMAR HAUPT.